(12) United States Patent
Fang et al.

(10) Patent No.: US 9,392,624 B2
(45) Date of Patent: Jul. 12, 2016

(54) METHODS AND APPARATUS FOR RADIO CONFIGURATION INDICATION

(75) Inventors: Yonggang Fang, San Diego, CA (US); YuanFang Yu, Shenzhen (CN); Xiaowu Zhao, Shenzhen (CN); Ting Lu, Beijing (CN)

(73) Assignees: ZTE Corporation, Shenzhen (CN); ZTE (USA) Inc., Austin, TX (US)

( * ) Notice: Subject to any disclaimer, the term of this patent is extended or adjusted under 35 U.S.C. 154(b) by 166 days.

(21) Appl. No.: 13/410,271

(22) Filed: Mar. 1, 2012

(65) Prior Publication Data

US 2012/0224561 A1 Sep. 6, 2012

Related U.S. Application Data

(60) Provisional application No. 61/448,577, filed on Mar. 2, 2011.

(51) Int. Cl.
*H04W 4/00* (2009.01)
*H04W 76/02* (2009.01)
*H04W 8/24* (2009.01)

(52) U.S. Cl.
CPC ............... *H04W 76/02* (2013.01); *H04W 8/24* (2013.01)

(58) Field of Classification Search
CPC ................................................ H04W 36/0005
USPC ........................... 370/331, 328, 335; 455/438
See application file for complete search history.

(56) References Cited

U.S. PATENT DOCUMENTS

| 7,120,134 | B2 | 10/2006 | Tiedemann, Jr. et al. |
| 2005/0135320 | A1 | 6/2005 | Tiedemann, Jr. et al. |
| 2006/0068789 | A1* | 3/2006 | Vannithamby et al. ........ 455/436 |
| 2007/0232353 | A1* | 10/2007 | Miyazaki et al. ............. 455/557 |
| 2008/0161032 | A1* | 7/2008 | Xue et al. ...................... 455/520 |
| 2008/0212519 | A1 | 9/2008 | Fang et al. |

(Continued)

FOREIGN PATENT DOCUMENTS

| CN | 1252910 A | 5/2000 |
| CN | 101013906 A | 8/2007 |
| CN | 101048002 A | 10/2007 |

(Continued)

OTHER PUBLICATIONS

"Interoperability Specification (IOS) for cdma2000 11 Access Network Interfaces—Part 1 Overview", 3GPP2 Spec #A. S0011-C, Version 2.0, 28 pages, Dec. 2005.

(Continued)

*Primary Examiner* — Ian N Moore
*Assistant Examiner* — Mewale Ambaye
(74) *Attorney, Agent, or Firm* — Perkins Coie LLP

(57) ABSTRACT

Techniques for facilitating wireless communication include receiving a message from a mobile station, the message comprising a service option field indicative of an advanced radio configuration capability of the mobile station and establishing a radio link between the mobile station and the serving base station, by using the indicated advanced radio configuration capability. In some implementations, in a CDMA2000 network, a Revision E compliant mobile station is able to operate in Revision E mode with a Revision E base station and a legacy mode with a legacy base station, without being affected by a handoff and without a need to modify bit length of the revision field in the paging response message from the mobile station.

21 Claims, 11 Drawing Sheets

(56) References Cited

U.S. PATENT DOCUMENTS

2008/0268917 A1* 10/2008 Chang et al. .................. 455/574
2012/0236822 A1   9/2012 Fang et al.

FOREIGN PATENT DOCUMENTS

| CN | 101304560 A | 11/2008 |
| WO | 98/48583 A2 | 10/1998 |
| WO | 2006/128324 A1 | 12/2006 |

OTHER PUBLICATIONS

Zanoio, E., et al., "White Paper: CDMA Network Technologies: A Decade of Advances and Challenges," 11 pages, Apr. 2004.

Chinese Office Action dated May 6, 2014 for Chinese Patent Application No. 201210067313.X, filed on Mar. 14, 2012 (9 pages).

Chinese Office Action dated Feb. 28, 2014 for Chinese Patent Application No. 201210054821.4, filed on Mar. 2, 2012 (8 pages).

* cited by examiner

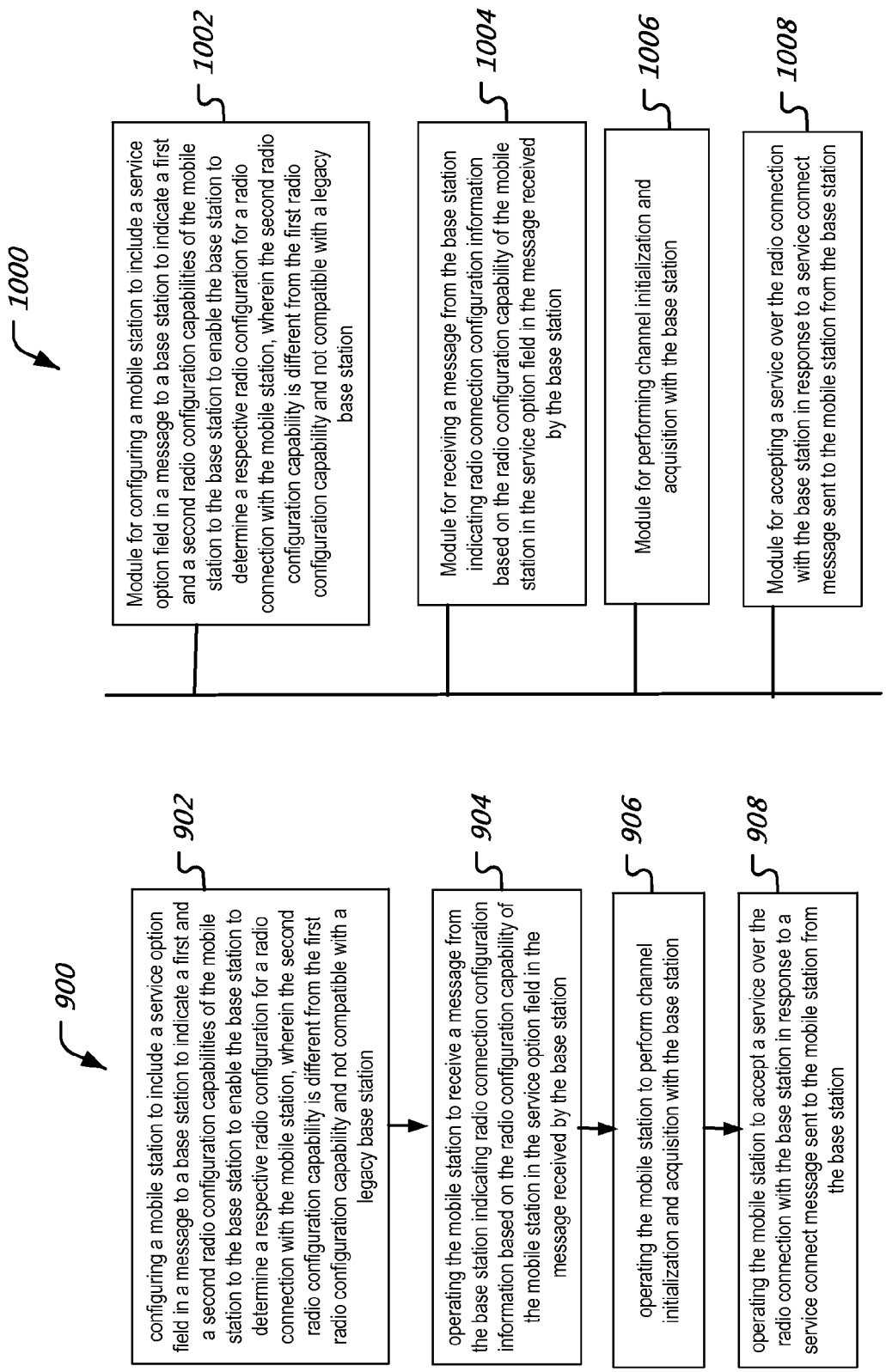

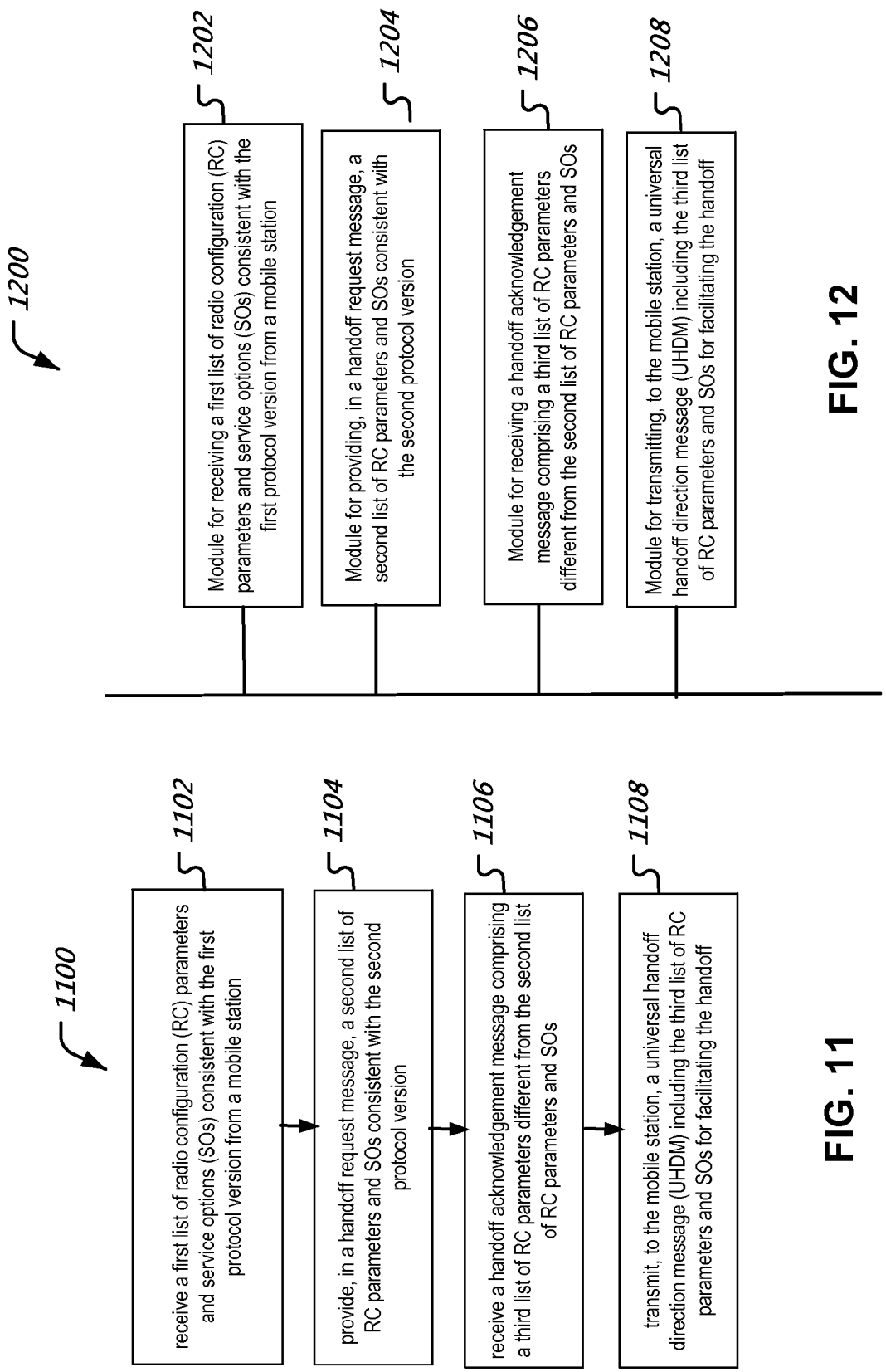

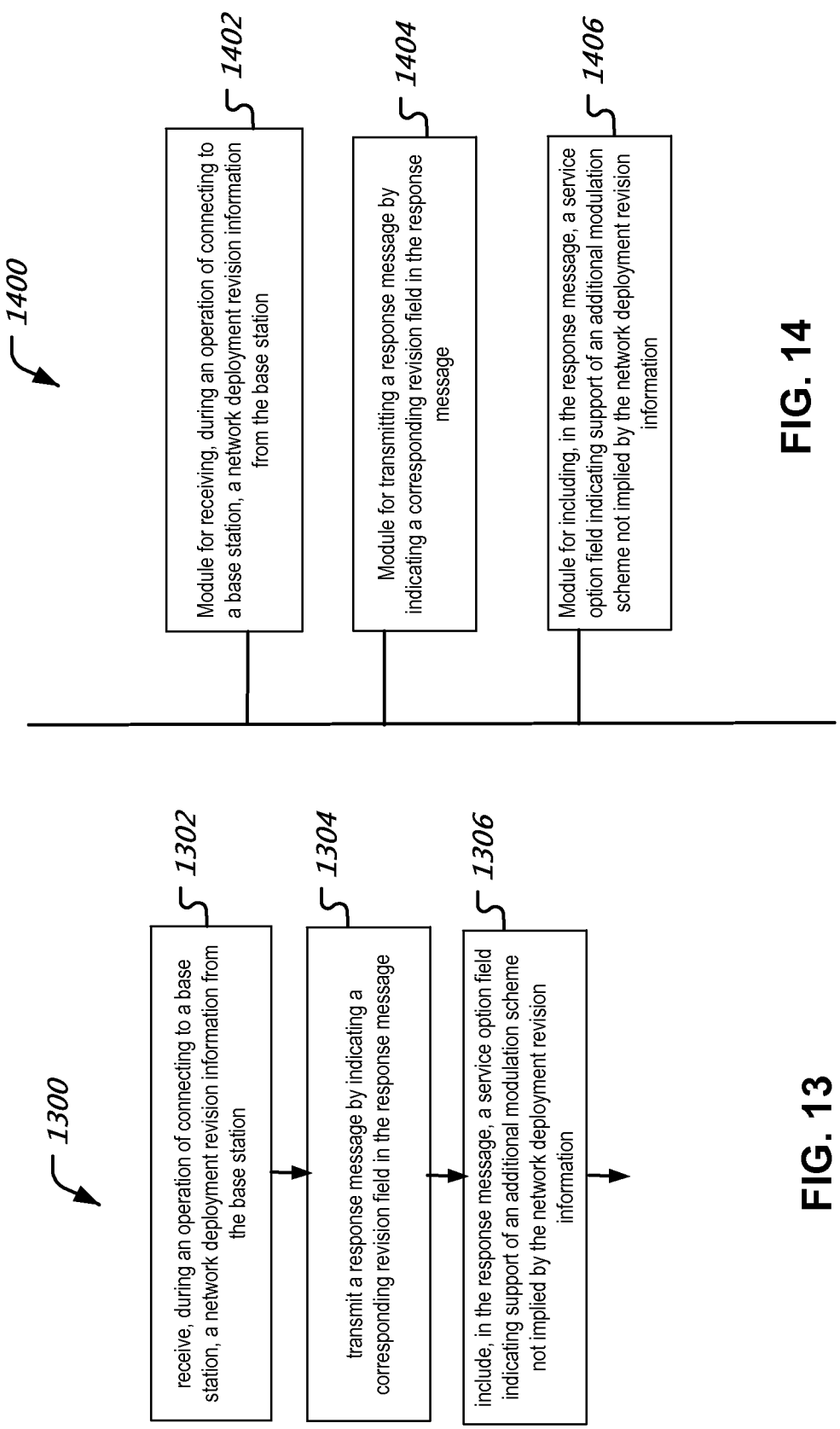

US 9,392,624 B2

METHODS AND APPARATUS FOR RADIO CONFIGURATION INDICATION

CROSS REFERENCE TO RELATED APPLICATIONS

This patent document claims the benefit of priority of U.S. Provisional Patent Application No. 61/448,577, entitled "Radio Configuration Indication in CDMA2000," filed on Mar. 2, 2011.

The entire content of the above referenced provisional patent application is incorporated by reference as a part of this patent document.

BACKGROUND

This patent document relates to wireless communications, wireless communication devices, wireless communications systems and related methods.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry signaling and data such as voice data and other data content to wireless devices. A base station can be referred to as an access point (AP) or access network (AN) or can be included as part of an access network. A wireless communication system can include one or more radio access network controllers to control one or more base stations. Examples of various wireless technologies include Long-Term Evolution (LTE), Code division Multiple Access (CDMA) such as CDMA2000 1x, and High Rate Packet Data (HRPD).

In operational scenarios, a mobile service provider may from time to time add newer versions of base stations and/or wireless devices to a wireless network. Such operational scenarios present the challenge of being able to operate in a backward compatible mode, yet at the same time benefit from newer features and technologies introduced in products.

Techniques are needed for improving wireless communications.

SUMMARY

This document describes technologies, among other things, for wireless communications in which mobile stations and base stations having different release versions interoperate.

In one aspect, a method of facilitating wireless communication includes receiving a message from a mobile station currently being served by a serving base station, the message comprising a service option field indicative of an advanced radio configuration capability of the mobile station and establishing a radio link between the mobile station and the serving base station, by using the indicated advanced radio configuration capability.

In another aspect, a disclosed apparatus for communicating radio configuration capability of a mobile station in a CDMA2000 communication system includes a message configurer that configures a mobile station to include a service option field in a message to a base station to indicate a first and a second radio configuration capabilities of the mobile station to the base station to enable the base station to determine a respective radio configuration for a radio connection with the mobile station, wherein the second radio configuration capability is different from the first radio configuration capability and not compatible with a legacy base station, a message receiver that receives a message from the base station indicating radio connection configuration information based on the radio configuration capability of the mobile station in the service option field in the message received by the base station, an initializer that performs channel initialization and acquisition with the base station and a service connection establisher that accepts a service over the radio connection with the base station in response to a service connect message sent to the mobile station from the base station.

In yet another aspect, a CDMA2000 wireless network system comprises a Revision E specification compliant mobile station (MS), a Revision E specification compliant base station (Rev E BS), a legacy base station that is not compliant with Revision E specification, wherein the MS is operable to transmit an alternate service option parameter in a Page Response Message (PRM) and an Origination Message (ORM), the Rev E BS is operable to establish a radio link with the MS using the alternate service option parameter transmitted by the MS and the legacy base station is operable to establish a radio link with the MS by ignoring the alternate service option parameter in the PRM and the ORM.

In yet another aspect, a method of wireless communication is disclosed, including receiving, during an operation of connecting to a base station, a network deployment revision information from the base station, transmitting a response message by indicating a corresponding revision field in the response message and including, in the response message, a service option field indicating support of an additional modulation scheme not implied by the network deployment revision information.

The details of one or more implementations are set forth in the accompanying attachments, the drawings, and the description below. Other features will be apparent from the description and drawings, and from the claims.

BRIEF DESCRIPTION OF THE DRAWINGS

FIG. 9 is a flow chart representation of a method for communicating radio configuration capability of a mobile station in a CDMA2000 communication system.

FIG. 10 is a block diagram representation of a portion of a wireless communications apparatus for communicating radio configuration capability of a mobile station in a CDMA2000 communication system.

FIG. 11 is a flow chart representation of a method of facilitating a handoff of a mobile station from a first base station operating using a first protocol version to a second base station operating using a second protocol version different from the first protocol version.

FIG. 12 is a block diagram representation of a portion of an apparatus for facilitating a handoff of a mobile station from a first base station operating using a first protocol version to a second base station operating using a second protocol version different from the first protocol version.

FIG. 13 is a flow chart representation of a method of wireless communications.

FIG. 14 is a block diagram representation of a portion of an apparatus for wireless communications.

Like reference symbols in the various drawings indicate like elements.

DETAILED DESCRIPTION

In the description below, techniques are provided for facilitating wireless communications. In one aspect, the provided techniques are useful for efficient operation of a mobile station in a wireless network.

Figure 1:
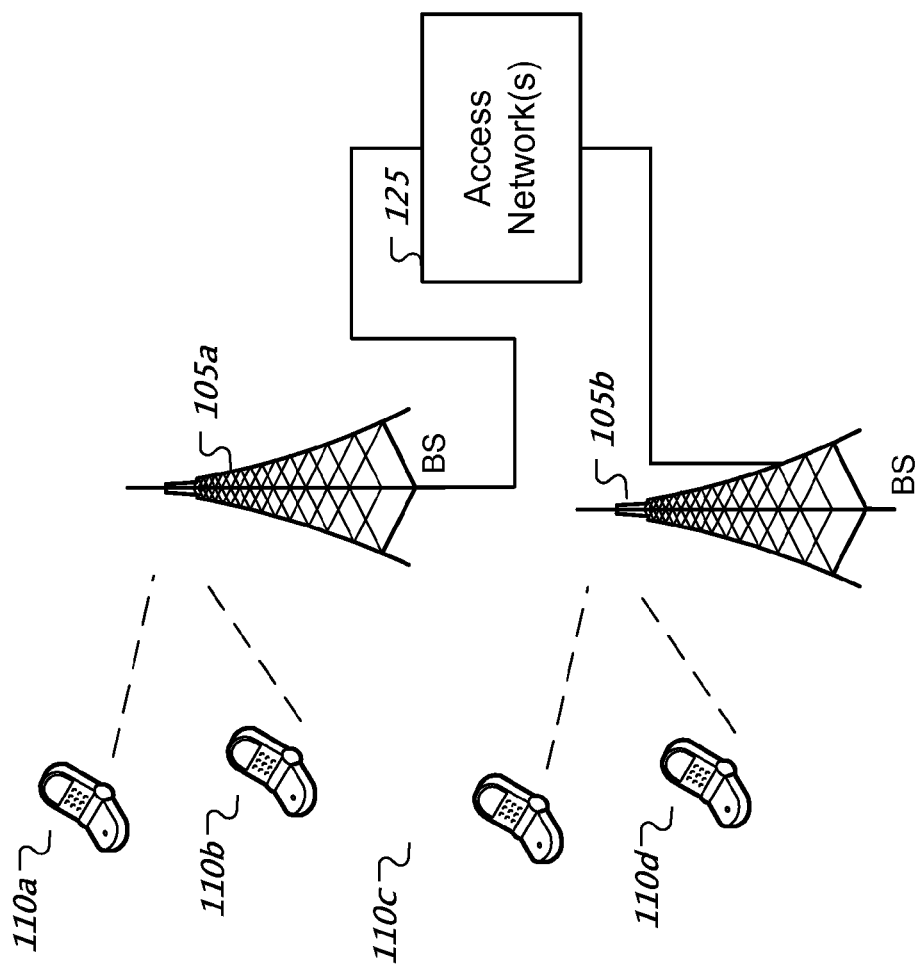
FIG. 1 shows an example of a wireless communication system.

FIG. 1 shows an example of a wireless communication system. A wireless communication system can include one or more base stations (BSs) 105a, 105b, one or more wireless devices 110 and an access network 125. Base station 105a, 105b can provide wireless service to wireless devices 110 in one or more wireless sectors. In some implementations, a base station (e.g., 105a or 105b) includes directional antennas to produce two or more directional beams to provide wireless coverage in different sectors.

The access network 125 can communicate with one or more base stations 105, 105b. In some implementations, the access network 125 includes one or more base stations 105, 105b. In some implementations, the access network 125 is in communication with a core network (not shown in FIG. 1) that provides connectivity with other wireless communication systems and wired communication systems. The core network may include one or more service subscription databases to store information related to the subscribed wireless devices 110. A first base station 105 can provide wireless service based on a first radio access technology, whereas a second base station 105 can provide wireless service based on a second radio access technology. The base stations 105 may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO). For CDMA200 systems, the core network 125 can include, among others, mobile switching center (MSC), Packet Data Serving Node (PDSN) and others.

Figure 2:
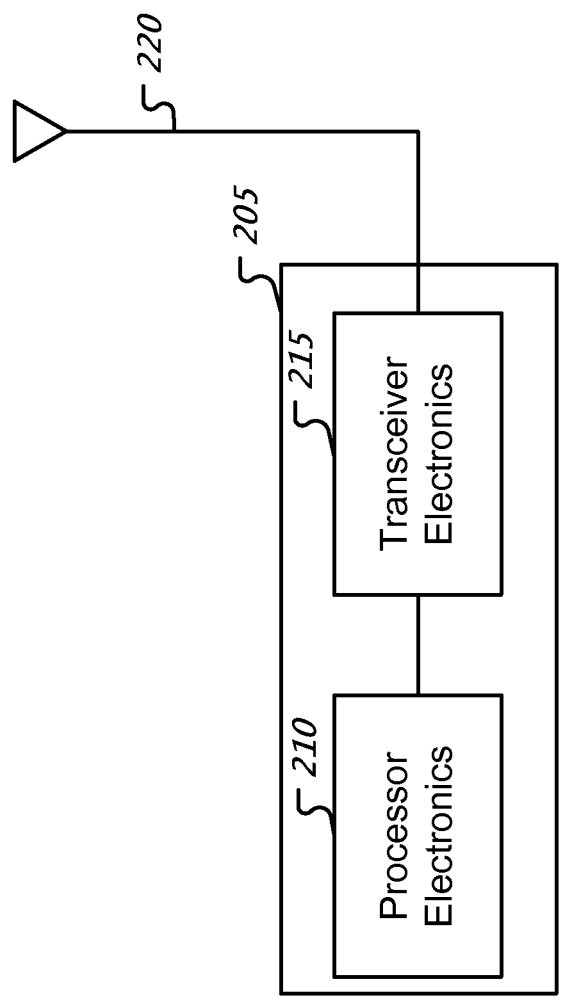
FIG. 2 shows example radio station architecture.

FIG. 2 is a block diagram representation of a portion of a radio station 205. A radio station 205 such as a base station or a wireless device can include processor electronics 210 such as a microprocessor that implements one or more of the wireless communications techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215.

In some implementations, radio stations 205 can communicate with each other based on a CDMA air interface. In some implementations, radio stations 205 can communicate with each other based on an orthogonal frequency-division multiplexing (OFDM) air interface which can include Orthogonal Frequency-Division Multiple Access (OFDMA) air interface. In some implementations, radio stations 205 can communicate using one or more wireless technologies such as CDMA such as CDMA2000 1x, HRPD, WiMAX, LTE, and Universal Mobile Telecommunications System (UMTS).

In a typical wireless communications system, radio configuration information is defined in a set of Forward Traffic Channel and Reverse Traffic Channel transmission formats that are characterized by physical layer parameters, such as transmission rates, modulation characteristics, and spreading rate. As an example of CDMA2000 1x system, a mobile station uses radio configuration bit maps to indicate its radio capabilities. The radio configuration bit maps include forward fundamental traffic channel radio capability bit map (FOR_FCH_RC_MAP) and reverse fundamental traffic channel radio capability bit map (REV_FCH_RC_MAP). According to the protocol revision in use (P_REV_IN_USE), which is determined by received P_REV (and MIN_P_REV) from base station and the mobile station's supported protocol revision (MOB_P_REV), the mobile station could set the radio configuration bit maps (REV_FCH_RC_MAP and FOR_FCH_RC_MAP) in an Origination Message (ORM), or Page Response Message (PRM) to indicate its radio capabilities. When the base station receives the radio configuration bit maps in ORM or PRM, it can know the mobile station's radio capabilities and assign a proper radio configuration in the Extended Channel Assignment Message (ECAM) to establish a proper radio link connection with the mobile station.

The CDMA2000 1x advanced defined in CDMA2000 1x Rev E specification is a new radio technology and can significantly improve the radio link performance. Many CDMA2000 1x networks in the field deployment are based on CDMA2000 1x Rel 0 or Rev A and cannot be readily upgraded to CDMA2000 1x Rev E by skipping some protocol revisions (such as Rev B, C, or D) in part because the existing CDMA2000 1x networks and mobile stations follow the protocol revision rule. In order to apply CDMA2000 1x advanced features to different previous revisions, the CDMA2000 1x Rev E implementation Guide Line was developed to guide the new CDMA2000 1x network and mobile stations to upgrade from different protocol revisions to CDMA2000 1x Rev E. According to the CDMA2000 1x Rev E Implementation Guide Line, the Rev E capable mobile station can send an Origination Message (ORM) with reverse and forward fundamental channel radio configuration information, REV_FCH_RC_MAP and FOR_FCH_RC_MAP, that indicate its radio configuration capability information of RC8 and RC11/12 regardless its P_REV_IN_USE. This suggested implementation, however, could cause some backward compatibility issues with legacy CDMA2000 1x base stations.

In some legacy CDMA2000 1x base stations implementation, the REV_FCH_RC_MAP_BIT and FOR_FCH_RC_MAP is set to a fixed length according to the P_REV_IN_USE. This makes the option of adding new bit fields of RC8, RC11 and RC 12 in REV_FCH_RC_MAP and FOR_FCH_RC_MAP impractical, although the CDMA2000 1x specification indicates the bit map size is increasable. When a new Rev E capable mobile station sends an ORG or PRM with RC8/RC11 in REV_FCH_RC_MAP_BIT and FOR_FCH_RC_MAP, the bit map sizes are increased. If the legacy base station receives ORM or PRM with the size-increased REV_FCH_RC_MAP_BIT and FOR_FCH_RC_MAP, it may not recognize the radio configuration bit maps and cause a call failure.

To fix this issue, one possible approach is to add one bit in CDMA2000 1x Rev E System Parameter Message to indicate the base station's capability. Using this approach, in some embodiments, the Rev E capable base station sets this indication to "1". If the Rev E capable mobile station receives this one bit ("1") indication broadcast by the CDMA2000 1x base station, it can send ORM or PRM with the RC8/11 in size increased REV_FCH_RC_MAP_BIT and FOR_FCH_RC_MAP. Otherwise, the Rev E capable mobile station sends the ORM or PRM with REV_FCH_RC_MAP_BIT and FOR_FCH_RC_MAP which size shall be matched in P_REV_IN_USE. However, this suggested fix may have a backward compatibility issue with the legacy 1x base station in a hard handoff.

When a Rev E mobile station that is communicatively connected with a CDMA2000 1x Rev E base station performs a hard handoff to a legacy 1x base station, the Rev E base station can send the Rev E mobile station's radio configuration information to the MSC. In response, the MSC passes this information with other configuration parameters in a Handoff Request message to the legacy 1x base station. The legacy 1x base station receives the size-increased REV_FCH_RC_MAP_BIT and FOR_FCH_RC_MAP, and rejects the call and causes the hard handoff failure.

When a Rev E capable mobile station is connecting to a legacy 1x base station and will hand off to a Rev E base station, the Rev E capable mobile station may not go to new RC mode since the legacy source 1x BS cannot get MS's new RC capability and pass to the target Rev E Base Station. This might degrade Rev E performance of the wireless system.

The techniques disclosed in this document based on using Service option (SO) to indicate the mobile station's radio configuration capability implicitly can be implemented in ways that solve this backward compatibility issue of CDMA2000 1x Rev E base station with legacy 1x base station in MO, MT calls and hard handoff. Presently, in various wireless networks, Service options are used to indicate options of applications such as voice, data, facsimile and others. It is proposed here to use a SO to implicitly indicate the New RC Capability by modifying the existing CDMA2000 Rev E specification to provide this feature.

For example, a service option (e.g. SO74) can be used in RC8 and RC11/12 only. This SO could be used with other voice, SMS, data, etc. service option categories.

The Rev E capable mobile station can be configured to include this new SO in various formats, e.g., in the ALT_SO of ORM or PRM.

The Rev E capable mobile station can include this new SO in Status Response Message for its new RC capability.

In some implementations, the Rev E base station broadcasts the same P_REV (MIN_P_REV) in the overhead messages as in the currently deployed network settings. The mobile station determines its P_REV_IN_USE according to its received P_REV (and MIN_P_REV) from base station and its MOB_P_REV, which is same as the existing CDMA2000 rule. The Rev E mobile station sets radio configuration in FOR_FCH_RC_MAP and REV_FCH_RC_MAP which are matched with P_REV_IN_USE in the ORM or PRM. The CDMA2000 1x Rev E capable mobile station can include SO74 in ALT_SO field to implicitly indicate its RC8/RC11 capability.

If Rev E capable mobile station cannot include SO74 in ALT_SO of ORM or PRM, it can use the supported RCs and SO to setup a call first and wait for Rev E BS to send Status Request Message. The Rev E capable mobile station can include SO74 in the Status Response Message to implicitly indicate its new RC8/11 capability.

In operation, a CDMA2000 1x base station receives an ORM or PRM and checks the ALT_SO field. A legacy 1x base station ignores SO74 in ALT_SO. The CDMA2000 1x Rev E base station treats SO74 in ALT_SO field of ORG or PRM as a new RC8/RC11 capability indication of mobile station and uses the new RC8/RC11 in the Extended Channel Assignment Message (ECAM).

For a hard handoff from legacy 1x Base Station to Rev E Base Station, if the legacy 1x call is on Rev E mobile, the source Base Station may include SO74 in the SO list of an interface associated with other supported SOs. If SO74 is received, the target Rev E BS can set up the new radio connection using RC8/RC11. Otherwise, the target Rev E Base Station can still use legacy RC (such as RC3/RC4) for the radio connection setup. The target Rev E Base Station then sends Status Request Message to get mobile's RC capability after handoff and re-configure radio connection with new RC8/11.

For the hard handoff from CDMA2000 1x Rev E Base Station to legacy 1x Base Station, the source Base Station includes SO74 in the SO list of A interface associated with other supported SOs. The target Base Station can determine radio connection based on its supported RCs and SO.

Figure 3:
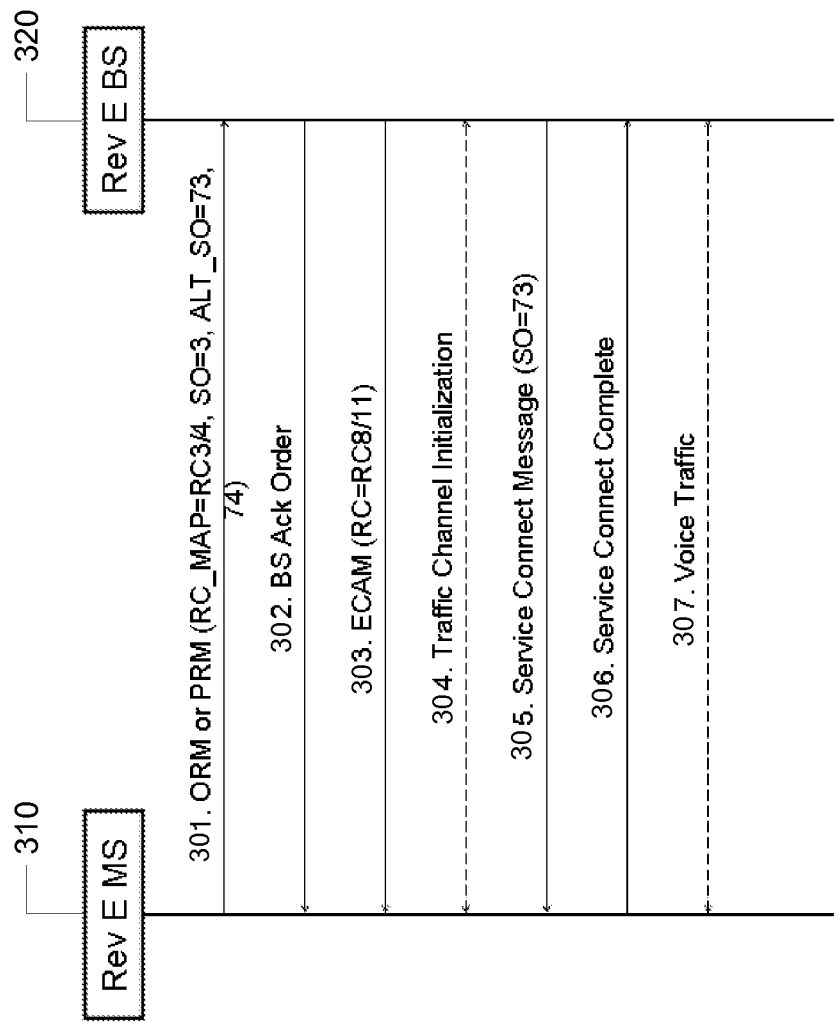
FIG. 3 is a signal exchange diagram showing an operational flow between a later version mobile station and a later version base station.

With reference to FIG. 3, an example of the operation flow between the Rev E MS and the Rev E BS in a chronological order for MO/MT Call with Rev E BS.

At 301, a Rev E mobile station sends an Origination message (ORM) or Page Response message (PRM) to Rev E base station with REV_FCH_RC_MAP=RC3, FOR_FCH_RC_MAP=RC4, SO=3, and ALT_SO=73, 74.

At 302, the BS receives the ORM or PRM from the MS and sends a BS Ack Order message to MS.

At 303, the BS checks ALT_SO field in ORM or PRM and finds MS is of RC8/11 capability. BS sends an Extended Channel Assignment Message (ECAM) with REV_FCH_RC=RC8 and FOR_FCH_RC=RC11.

At 304, MS and BS perform the traffic channel initiation and acquisition.

At 305, after traffic channel initiation complete, The BS sends a Service Connect message with SO73 to the MS for using EVRC-NW vocoder.

At 306, the MS sends a Service Connect Complete message to accept this service.

At 307, both MS and BS are on traffic channel for voice service.

Figure 4:
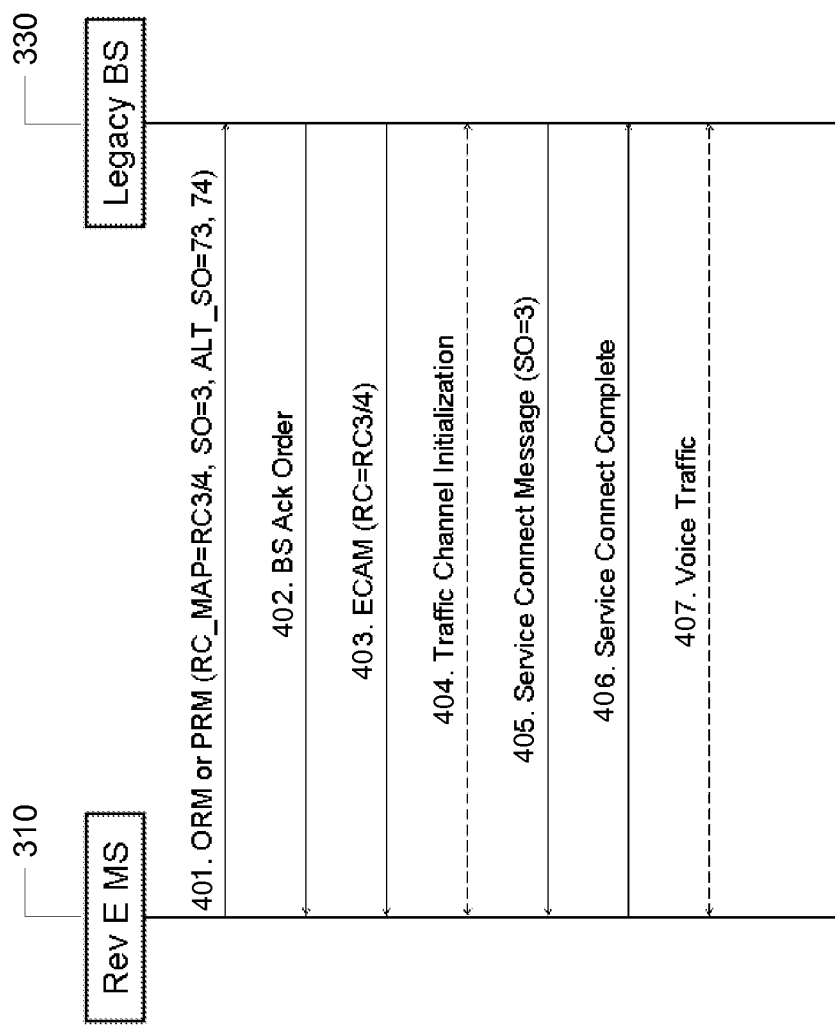
FIG. 4 is a signal exchange diagram showing an operational flow between a later version mobile station and a legacy base station.

With reference to FIG. 4, an example of the operation flow between the Rev E MS and a legacy BS in a chronological order for MO/MT Call.

At 401, a Rev E mobile station sends an Origination message (ORM) or Page Response message (PRM) to a legacy 1x base station with REV_FCH_RC_MAP=RC3, FOR_FCH_RC_MAP=RC4, SO=3, and ALT_SO=73, 74.

At 402, the BS receives the ORM or PRM from the MS and sends a BS Ack Order message to MS At 403, the legacy 1x BS may check ALT_SO field and cannot recognize SO73 and SO74. It sends an Extended Channel Assignment Message (ECAM) with REV_FCH_RC=RC3 and FOR_FCH_RC=RC4 to the MS.

At 404, MS and BS perform the traffic channel initiation and acquisition.

At 405, after traffic channel initiation complete, the BS sends a Service Connect message with SO3 to the MS.

At 406, the MS sends a Service Connect Complete message to accept this service.

At 407, both MS and BS are on traffic channel for voice service.

Figure 5:
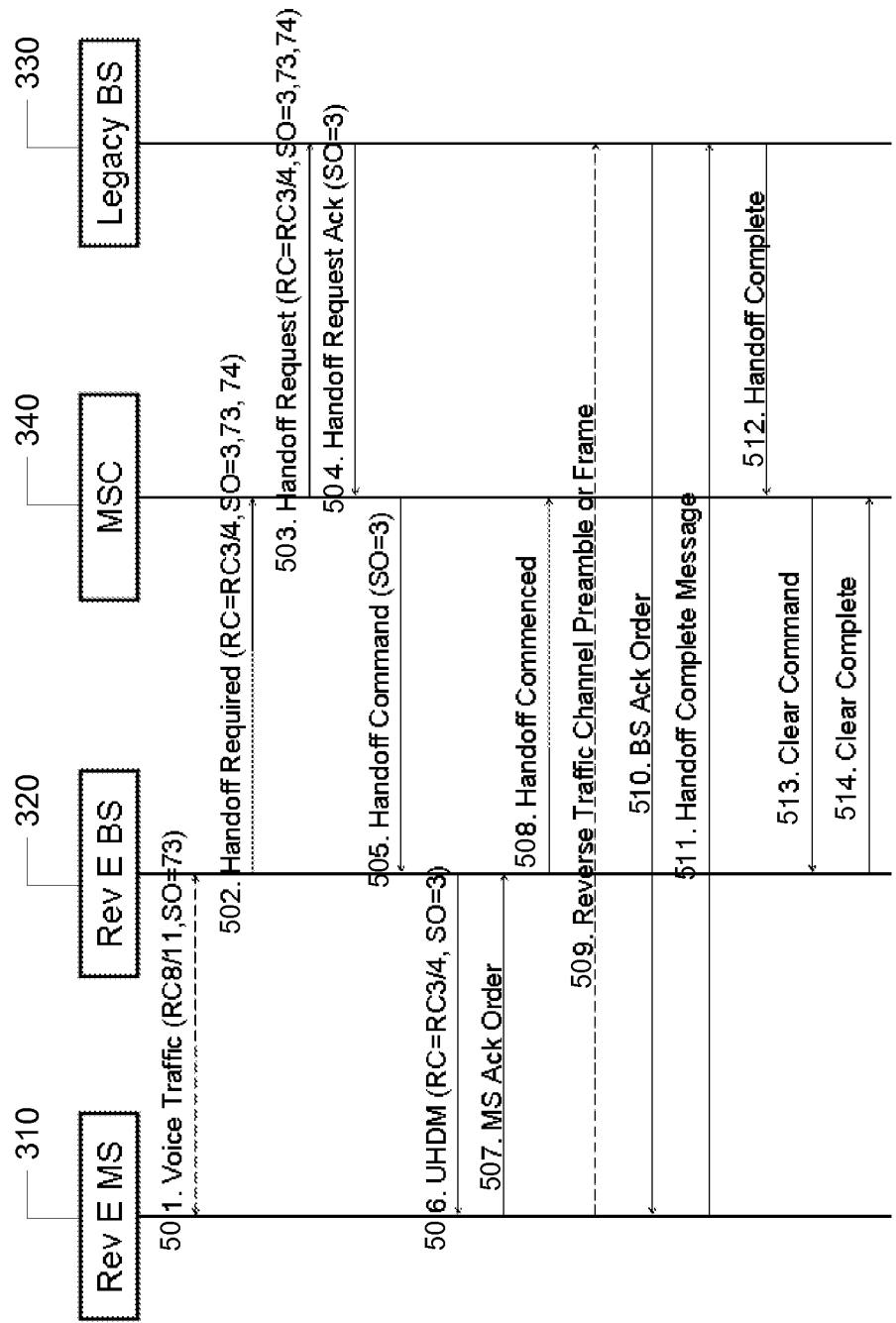
FIG. 5 shows an example of the operation flow for a hard handoff of a Rev E MS from a Rev E BS to a legacy 1xBS.

FIG. 5 shows an example of the operation flow for a hard handoff of a Rev E MS from a Rev E BS to a legacy 1xBS.

At 501, a Rev E mobile station is connecting with Rev E base station (source) for a voice call with service option SO73 and radio configuration RC8/11.

At 502, the source BS finds the MS is in the coverage with other BS and sends a Handoff Required message to MSC with radio configuration RC3/4 and service option SO3, SO73, SO74 in the SO List.

At 503, MSC sends the Handoff Request message to the target BS (legacy 1x) with radio configuration RC3/4 and service option SO3, SO73, SO74 in the SO List.

At 504, the target BS may not support SO73 and SO74, and sends back Handoff Request Ack with accepted service option SO3 and radio configuration RC3/4.

At 505, MSC passes SO3 and RC3/4 to the source BS in Handoff Command.

At 506, the source BS sends a Universal Handoff Direction Message (UHDM) message with radio configuration RC3/4 and service option SO3 to the MS.

At 507, after receiving the UHDM, the MS sends MS Ack Order message to the source BS.

At 508, the source BS then sends a Handoff Commenced message to MSC.

At 509, the MS and target BS start transmitting traffic channel preamble and acquisition using radio configuration RC3/4.

At 510, once the target BS acquires the traffic from the MS, it sends a BS Ack Order message to the MS.

At 511, the MS sends a Handoff Complete message to the target BS after receiving BS Ack Order.

At 512, the target BS then send a Handoff Complete message to MSC to trigger the radio resource cleanup procedure.

At 513, MSC sends a Clear Command to the source BS.

At 514, the source BS releases the resource related to the MS and sends a Clear Complete message to MSC.

Figure 6A:
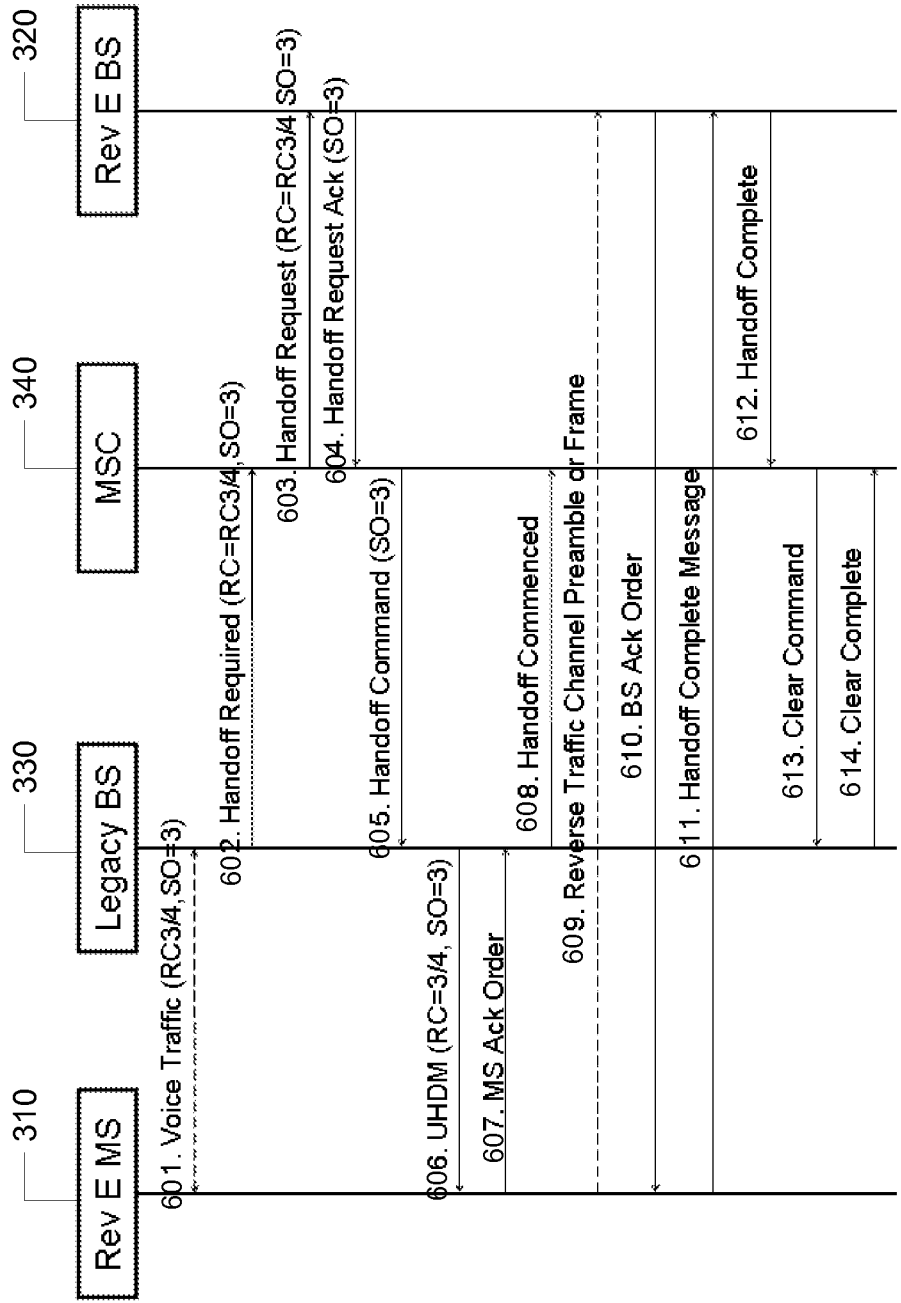
FIGS. 6A and 6B show an example of the operation flow for a hard handoff of a Rev E MS from a legacy 1xBS to a Rev E BS.
Figure 6B:
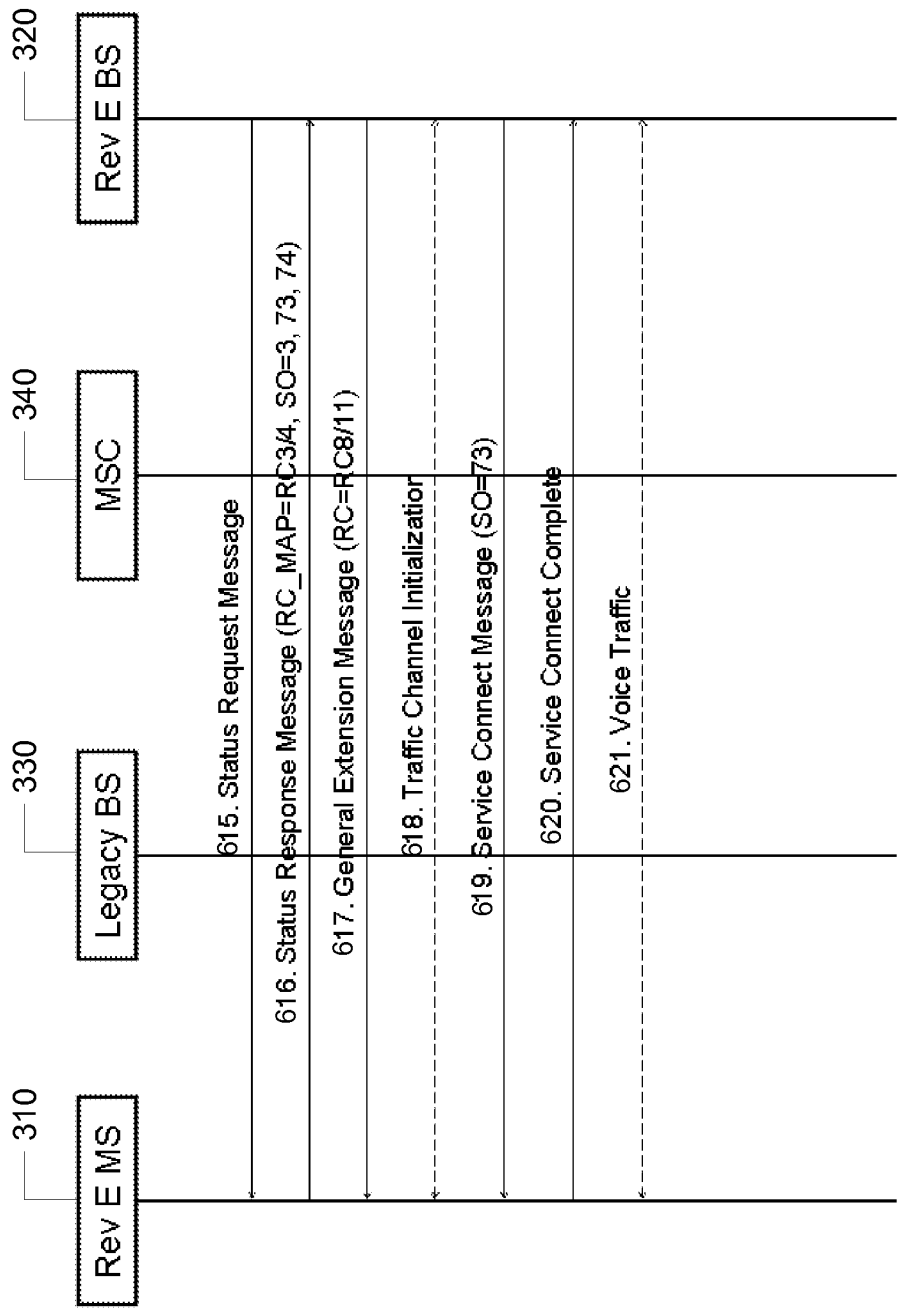

FIG. 6A and FIG. 6B show an example of the operation flow for a hard handoff of a Rev E MS from a legacy 1xBS to a Rev E BS.

At 601, a Rev E mobile station is connecting to legacy 1x base station (source) for a voice call with service option SO3 and radio configuration RC3/4.

At 602, the source BS finds the MS is in the coverage with other BS and sends a Handoff Required message to MSC with radio configuration RC3/4 and service option SO3.

At 603, MSC sends the Handoff Request message to the target Rev E BS with radio configuration RC3/4 and service option SO3.

At 604, the target BS sends back a Handoff Request Ack with accepted service option SO3 and radio configuration RC3/4.

At 605, MSC passes the SO3 and RC3/4 to the source BS in Handoff Command.

At 606, the source BS sends a Universal Handoff Direction Message (UHDM) with radio configuration RC3/4 and service option SO3 to MS.

At 607, after receiving the UHDM, MS sends MS Ack Order message to the source BS.

At 608, the source BS then sends a Handoff Commenced message to MSC.

At 609, MS and target BS start transmitting traffic channel preamble and acquisition using radio configuration RC3/4.

At 610, once the target BS acquires the traffic from MS, it sends a BS Ack Order message to MS.

At 611, MS sends a Handoff Complete message to the target BS after receiving BS Ack Order.

At 612, the target BS then send a Handoff Complete message to MSC to trigger the radio resource cleanup procedure.

At 613, MSC sends a Clear Command to source BS.

At 614, the source BS releases the resource related to the MS and sends a Clear Complete message to MSC.

At 615, the target BS sends a Status Request message to MS.

At 616, the MS sends Status Response Message back to the target BS with radio configuration RC3/4 and service option=3, 73 and 74.

At 617, based on information in SO74, the target BS can determine whether the MS is capable to handle RC8/11 and, accordingly, can send General Extension Message with new radio configuration (RC8/11).

At 618, MS and target BS setup traffic channel with the new radio configuration RC8/11.

At 619, after the traffic channel is established, the target BS sends a Service Connect message to MS to propose the new SO73 for EVRC-NW.

At 620, the MS sends a Service Connect Complete message to the target BS to accept the service option.

At 621, voice traffic can be established.

Both MS and target BS are now on the traffic channel with new radio configuration for the voice call using EVRC-NW vocoder.

Figures 7, 8:
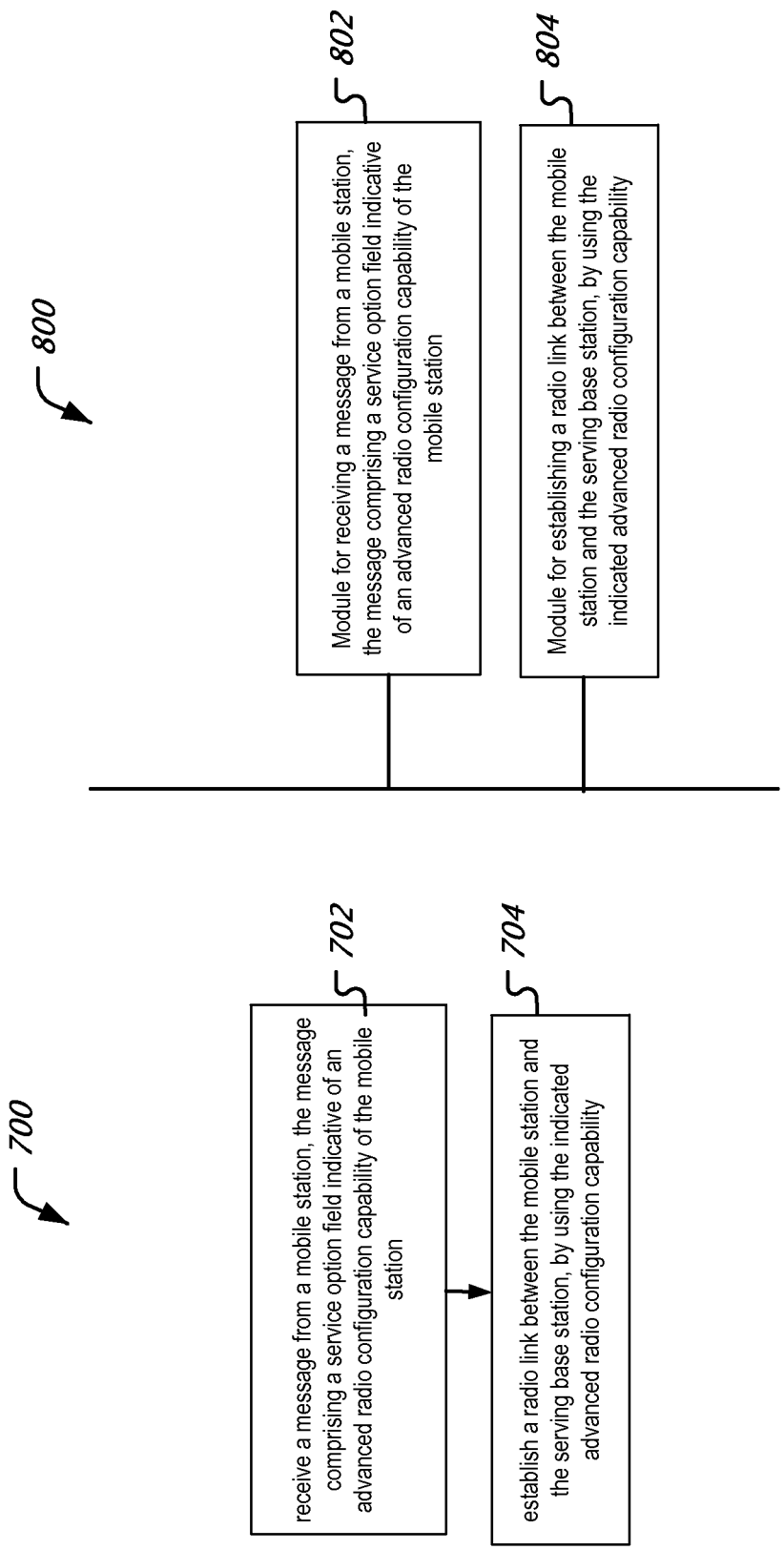
FIG. 7 is a flow chart representation of a process of wireless communications.
FIG. 8 is a block diagram representation of a portion of a wireless communications apparatus.

FIG. 7 is a flow chart representation of a method 700 of wireless communications. In some implementations, the method 700 is implemented at an advanced base station (e.g., a Rev E base station in a CDMA2000 network). At 702, a message from a mobile station is received. The message is, for example, a response message to a network revision indication transmitted in a broadcast message, as previously described. The message includes a service option field indicative of an advanced radio configuration capability of the mobile station. At 704, a radio link is established with the mobile station. The radio link uses the indicated advanced radio configuration capability. In some implementations, in a CDMA2000 network, the advanced radio configuration capability corresponds to RC8/11 options. In some implementations, the advanced modulation is used for transmitting and/or receiving that are modulated using the indicated modulation scheme.

In some implementations, during a handoff operation, for a possible handoff of the mobile station to a target base station (e.g., a legacy base station), the advanced radio configuration capability is communicated in a handoff message. In some implementations, this communication is achieved via the MSC, e.g., as described with respect to messages 502 and 503 above. As previously discussed, in some implementations, the received message is a paging response message or an origination message (message 301).

FIG. 8 is a block diagram representation of a portion of a wireless communications apparatus 800. The module 802 is for receiving a message from a mobile station, the message comprising a service option field indicative of an advanced radio configuration capability of the mobile station. The module 804 is for establishing a radio link with the mobile station, the radio link using the indicated advanced radio configuration capability. The apparatus 800 and modules 802, 804 may further be configured to implement one or more techniques described in this document.

FIG. 9 is a flow chart representation of a method 900 for communicating radio configuration capability of a mobile station in a CDMA2000 communication system. At 902, a mobile station is configured to include a service option field in a message (e.g., ORM or PRM message 301) to a base station to indicate a first and a second radio configuration capabilities of the mobile station to the base station to enable the base station to determine a respective radio configuration for a radio connection with the mobile station. As previously discussed, in some implementations, the second radio configuration capability (RC8/11) is different from the first radio configuration capability (RC3/4) and not compatible with a legacy base station (e. g., the legacy base station is not able to transmit/receive signals using the advanced radio configuration). At 904, the mobile station is operated to receive a message from the base station indicating radio connection configuration information based on the radio configuration capability of the mobile station in the service option field in the message received by the base station. At 906, the mobile station is operated to perform channel initialization and acquisition with the base station. At 908, the mobile station is operated to accept a service over the radio connection with the base station in response to a service connect message sent to the mobile station from the base station.

FIG. 10 is a block diagram representation of a portion of a wireless communications apparatus 1000 for communicating radio configuration capability of a mobile station in a CDMA2000 communication system. The module 1002 is for configuring a mobile station to include a service option field in a message to a base station to indicate a first and a second radio configuration capabilities of the mobile station to the base station to enable the base station to determine a respective radio configuration for a radio connection with the mobile station, wherein the second radio configuration capability is different from the first radio configuration capability and not compatible with a legacy base station. The module 1004 is for receiving a message from the base station indicating radio connection configuration information based on the radio configuration capability of the mobile station in the service option field in the message received by the base station. The module 1006 is for performing channel initialization and acquisition with the base station. The module 1008 is for accepting a service over the radio connection with the base station in response to a service connect message sent to the mobile station from the base station. The apparatus 1000 and modules 1002, 1004, 1006 and 1008 may be further configured to implement one or more techniques described in this document.

FIG. 11 is a flow chart representation of a method 1100 of facilitating a handoff of a mobile station from a first base station operating using a first protocol version to a second base station operating using a second protocol version different from the first protocol version. At 1102, a first list of radio configuration (RC) parameters and service options (SOs) consistent with the first protocol version from a mobile station is received. For example, in a CDMA2000 network, the list of RC parameters and SOs may include RC_MAP=RC3/4 and SO=3, as previously discussed. At 1104, a second list of RC parameters and SOs consistent with the second protocol version is provided in a handoff request message. As previously discussed, the second list may include RC_MAP=RC3/4, SO=3, 73, 74 (message 502). At 1106, a handoff acknowledgement message comprising a third list of RC parameters and SOs different from the second list of RC parameters and SOs is received. As previously discussed, the third list may include SO=3 (message 504). At 1108, a universal handoff direction message (UHDM) including the third list of RC parameters and SOs for facilitating the handoff is transmitted to the mobile station (message 506).

FIG. 12 is a block diagram representation of a portion of an apparatus 1200 for facilitating a handoff of a mobile station from a first base station operating using a first protocol version to a second base station operating using a second protocol version different from the first protocol version. The module 1202 is for receiving a first list of radio configuration (RC) parameters and service options (SOs) consistent with the first protocol version from a mobile station. The module 1204 is for providing, in a handoff request message, a second list of RC parameters and SOs consistent with the second protocol version. The module 1206 is for receiving a handoff acknowledgement message comprising a third list of RC parameters different from the second list of RC parameters and SOs. The module 1208 is for transmitting, to the mobile station, a universal handoff direction message (UHDM) including the third list of RC parameters and SOs for facilitating the handoff. The apparatus 1200 and modules 1202, 1204, 1206 and 1208 may further be configured to implement one or more techniques described in this document.

FIG. 13 is a flow chart representation of a method 1300 of wireless communications. In some implementations, the method 1300 is implemented at a mobile device. At 1302, during the operation of connecting to a base station, network deployment revision information from the base station is received. As previously discussed, the network deployment revision, e.g., is indicated as the P_REV field broadcast by the base station. At 1304, a response message is transmitted by indicating a corresponding revision field in the response message. As previously discussed, in some implementations, the mobile station determines its P_REV_IN_USE according to its received P_REV (and MIN_P_REV) from base station and its MOB_P_REV and transmits radio configuration matching the received revision field. At 1306, a service option field indicating support of an additional modulation scheme not implied by the network deployment revision information is included in the response message.

FIG. 14 is a block diagram representation of a portion of an apparatus 1400 for wireless communications. The module 1402 is for receiving, during an operation of connecting to a base station, network deployment revision information from the base station. The module 1404 is for transmitting a response message by indicating a corresponding revision field in the response message. The module 1406 is for including, in the response message, a service option field indicating support of an additional modulation scheme not implied by the network deployment revision information. The apparatus 1400 and modules 1402, 1404 and 1406 may further be configured to implement one or more techniques disclosed in this document.

It will be appreciated that implementations of several techniques are described for efficient operation of a mobile station that has advanced modulation capabilities to interoperate with base stations implementing different revisions of protocol specification.

It will further be appreciated that, in one aspect, the mobile station transmits a response message indicating its advanced radio configuration capabilities such that a legacy base station is able to ignore the advanced radio configuration capabilities. On the other hand, an advanced base station is able to receive/process the indication of advanced radio configuration capabilities, and accordingly establish a radio link with the mobile station using the advanced radio configuration capabilities. In one aspect, this behavior is achieved by modifying an existing response message as follows: (1) the length in bits of the revision indication field is not changed (thus a legacy base station is able to receive/process the response message) and (2) a service option field is "re-purposed" to indicate the advanced radio configuration capabilities.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of facilitating wireless communication, comprising:
   receiving a message from a mobile station currently being served by a serving base station in a CDMA 2000 network, the message comprising a service option field containing a plurality of radio configurations supported by the mobile station, wherein the plurality of radio configurations include options 8 and 11 that are not compatible with radio control capabilities supported by a legacy network, wherein an indication of a radio configuration, among the plurality of the radio configurations, is selectively recognized by the serving base station depending on whether the serving base station supports the radio configuration;
   establishing a radio link between the mobile station and the serving base station, by using the indicated radio configuration if the serving base station supports the radio configuration and otherwise establishing the radio link by using a radio configuration supported by the serving base station; and
   communicating, during a handoff operation for a possible handoff of the mobile station to a target base station, wherein the target base station implements a protocol revision that is different from that of the serving base station, the supported radio configurations in a handoff message to the target base station.

2. The method recited in claim 1, wherein the received message comprises a paging response message.

3. The method recited in claim 1, wherein the received message comprises an origination message.

4. The method recited in claim 3, wherein the radio configuration is indicated without increasing a length of a protocol version bit field.

5. An apparatus for wireless communication, comprising:
a message receiver of a serving base station in a CDMA 2000 network that receives a message from a mobile station, the message comprising a service option field containing a plurality of radio configurations supported by the mobile station, wherein a subset of the plurality of radio configurations include options 8 and 11 that are not compatible with radio control capabilities supported by a legacy network, wherein an indication of a radio configuration, among the plurality of the radio configurations, is selectively recognized by the serving base station depending on whether the serving base station supports the radio configuration;
a memory; and
an processor configured to read code instructions from the memory and perform operations of:
establishing a radio link between the mobile station and the apparatus using the indicated radio configuration if the serving base station supports the radio configuration and otherwise establishes the radio link using a radio configuration supported by the serving base station; and
communicating, during a handoff operation for a possible handoff of the mobile station to a target base station that is implementing a protocol revision that is different from the serving base station, the supported radio configurations in a handoff message to the target base station.

6. The apparatus recited in claim 5, wherein the received message comprises a paging response message.

7. The apparatus recited in claim 5, wherein the received message comprises an origination message.

8. The method recited in claim 7, wherein the radio configuration is indicated without increasing a length of a protocol version bit field.

9. A computer program product comprising a transitory, computer-readable medium having code stored thereupon, the code, when executed by a processor, causing the processor to:
receive, at a serving base station in a CDMA 2000 network, a message from a mobile station, the message comprising a service option field containing a plurality of radio configurations supported by the mobile station, wherein the plurality of radio configurations include options 8 and 11 that are not compatible with radio control capabilities supported by a legacy network, wherein an indication of a radio configuration, among the plurality of the radio configurations, that is selectively recognized by the serving base station depending on whether the serving base station supports the radio configuration;
establish a radio link with the mobile station using the indicated radio configuration if the serving base station supports the radio configuration and otherwise establish the radio link using a radio configuration supported by the serving base station; and
communicate, during a handoff operation for a possible handoff of the mobile station to a target base station, the supported radio configurations in a handoff message to the target base station wherein the target base station implements a protocol revision that is different from that of the target base station.

10. The computer program product recited in claim 7, wherein the received message comprises a paging response message.

11. The computer program product recited in claim 7, wherein the received message comprises an origination message.

12. The computer program product recited in claim 11, wherein the radio configuration is indicated without increasing a length of a protocol version bit field.

13. The method of claim 1, further comprising:
transmitting, upon receiving the message from the mobile station, an extended channel assignment message indicative of support for the radio configuration by the serving base station.

14. The apparatus of claim 5, wherein the serving base station transmits, upon receiving the message from the mobile station, an extended channel assignment message indicative of support for the radio configuration by the serving base station.

15. The computer program product of claim 9, wherein the code, when executed by the processor, further causes the processor to:
transmit, upon receiving the message from the mobile station, an extended channel assignment message indicative of support for the radio configuration.

16. The method of claim 1, wherein establishing the radio link further comprises:
assigning the radio configuration in an Extended Channel Assignment Message (ECAM).

17. The method recited in claim 3, wherein the radio configuration is indicated without modifying a System Parameter Message from the serving base station.

18. The apparatus of claim 5, wherein establishing the radio link further comprises:
assigning the radio configuration in an Extended Channel Assignment Message (ECAM).

19. The apparatus of claim 7, wherein the radio configuration is indicated without modifying a System Parameter Message from the serving base station.

20. The computer program product of claim 9, wherein the code, when executed by the processor to establish the radio link, further causes the processor to:
assign the radio configuration in an Extended Channel Assignment Message (ECAM).

21. The computer program product of claim 11, wherein the radio configuration is indicated without modifying a System Parameter Message from the serving base station.

* * * * *